United States Patent Office.

J. SHAW OF BRIDGEPORT, CONNECTICUT.

Letters Patent No. 69,846, dated October 15, 1867.

IMPROVED COMPOSITION FOR INK.

*The Schedule referred to in these Letters Patent and making part of the same.*

TO ALL WHOM IT MAY CONCERN:

Be it known that I, J. SHAW, of Bridgeport, in the county of Fairfield, and State of Connecticut, have invented a new and improved "Indelible Ink;" and I do hereby declare that the following is a full, clear, and exact description thereof, which will enable others skilled in the art to fully understand and make use of the same.

The ink embraced by this invention is composed of the ingredients mixed together in and about the proportions below stated, viz: Five (5) gallons soft water; one (1) pound extract of logwood; one (1) ounce bicarbonate of potash; one (1) ounce bichromate of potash; forty (40) grains cyanide of potassium; eighty (80) grains prussiate of potash.

The water is first heated to the boiling point in an iron or other suitable kettle or vessel, and the logwood (previously ground or pulverized) then added and the mixture stirred until the logwood has become fully dissolved. The bicarbonate of potassa, previously dissolved in a gill of hot water, is then added to the above, and after being stirred for half a minute, more or less, the bichromate of potash, dissolved in a similar manner to the bicarbonate of potash, is then added, together with the cyanide of potassium and the prussiate of potassa previously dissolved together, if so desired, in a gill of hot water. The several potassa having thus been mixed with the water and logwood dissolved in it, the whole mixture is then boiled for about a minute, at the same time being stirred, when, having allowed the mixture to cool and settle, it is ready for being bottled and for use.

The ink produced as above is of a permanent blue-black color, and indestructible and imperishable, and when used cannot be erased or removed by oxalic acid, chlorine, or any other chemical agent without destroying the paper written upon by it.

If desired to reduce the ink liquid to a granulated form, pour it off from its sediment into an iron pan or kettle, and therein evaporate it to dryness over a slow heat, which, being nearly done, stir it to a powder and then dry it slowly, or dry it in a cake form, pulverizing it afterward in a suitable mill. It can then be put up in paper or paper boxes, and when desired to be used only requires to be dissolved in soft water, with three or four ounces of the ink-powder to a gallon of the water. In the powdered or granulated form above stated, the ink can be kept or preserved for any length of time without injury, even in cold weather by the frost, and in such form it can be packed or stored in a much less space than in a liquid state—an advantage in transportation by sea or land.

If the ink is to be used for copying purposes, it is best to mix with it from two (2) to four (4) ounces of brown sugar to a gallon of the ink, and if for marking cloth with a stencil-plate, a sufficient small quantity of gum-mucilage may be also added to prevent its spreading. When no sugar or gum is used there is no tendency of the ink to mould, and even with either or both of them, it tends but slightly to mould, which can be wholly overcome by the addition of a few drops of creosote.

I claim as new and desire to secure by Letters Patent—

An ink composed of the ingredients hereinabove named, and mixed together in the manner and in or about the several proportions substantially as specified.

J. SHAW.

Witnesses:
   WM. F. McNAMARA,
   ALEX. F. ROBERTS.